United States Patent [19]

Norbut

[11] Patent Number: 4,844,239
[45] Date of Patent: Jul. 4, 1989

[54] CONVEYOR SYSTEM

[76] Inventor: Jerry Norbut, 1409 Columbus Dr., Bolingbrook, Ill. 60439

[21] Appl. No.: 163,535

[22] Filed: Mar. 3, 1988

Related U.S. Application Data

[62] Division of Ser. No. 847,224, Apr. 2, 1986, Pat. No. 4,738,352.

[51] Int. Cl.$^4$ .............................................. B65G 39/16
[52] U.S. Cl. ...................................... 198/842; 193/37
[58] Field of Search ............... 198/780, 835, 836, 842; 193/35 R, 37; 384/58, 542, 903

[56] References Cited

U.S. PATENT DOCUMENTS

| | | | |
|---|---|---|---|
| 2,936,063 | 5/1960 | Hemsley | 198/500 |
| 3,289,818 | 12/1966 | Kittredge | 198/841 X |
| 4,109,343 | 8/1978 | Weis et al. | 384/542 X |
| 4,230,223 | 10/1980 | Flajnik | 198/836 X |

FOREIGN PATENT DOCUMENTS 0873714  6/1971  Canada ................................ 198/842

*Primary Examiner*—Frank E. Werner
*Assistant Examiner*—Lyle K. Kimms
*Attorney, Agent, or Firm*—Kinzer, Plyer, Dorn, McEachran & Jambor

[57] ABSTRACT

A cable conveyor for transporting articles through a curved path of transport is disclosed. The conveyor has a plurality of pulley assemblies rotatably mounted on a conveyor frame. A cable tangentially contacts and is guided by each successive pulley assembly. The cable carries and transports the articles as it is pulled through a path defined by the pulley assemblies. The pulley assemblies may be spaced so that the path they define is shaped substantially the same as the shape of the conveyor frame. The conveyor may provide a spiral path of transport so that the articles may be raised or lowered. Alternatively, the conveyor may provide an arc to transport the articles from one direction of transport to another.

1 Claim, 3 Drawing Sheets

4,844,239

CONVEYOR SYSTEM

This is a division of co-pending application Ser. No. 847,224, filed on Apr. 2, 1986, now U.S. Pat. No. 4,738,352, issued Apr. 19, 1988.

BACKGROUND OF THE INVENTION

This invention relates to conveyors for transporting articles, such as cans, within a facility, such as a factory. More particularly, the present invention relates to cable conveyors, and provides a means for conveying articles around corners, from one level to another, and for cooling the articles during transport.

Conveyor systems which convey articles from one level to another, that is, lower or elevate the articles, are generally known in the art. Such generally known systems include what are known in the art as double-belt elevators, side grip elevators, magnetic elevators, and cable alpine systems.

Conveyor systems which provide a means for turning corners are also generally known. Such cable conveyor systems generally use 12-inch, 15-inch, or 18-inch diameter castings for this purpose.

SUMMARY OF THE INVENTION

The device of the present invention provides a conveyor system having a combination of advantages not heretofore achieved in one device. It provides a curved path of transport for the articles. As a lowerator and elevator, it provides for accumulation: if there is a stoppage ahead of the device, the articles can be accumulated so that the device need not be shut off immediately; thus, a separate accumulation conveyor is not required with the present invention. In addition, the device of the present invention utilizes a comparatively small amount of floor space in the facility. It can be completely manufactured outside of the facility and can be readily installed at the facility.

As a cornering device, the present invention allows for turns with a comparatively large radius of curvature. Thus, it lends itself particularly well to high-speed conveying and to conveying large diameter containers.

Accordingly, the present invention provides a cable conveyor for transporting articles through a curved path of transport. The conveyor comprises a plurality of pulley assemblies disposed in a curved pattern on a conveyor frame. A cable for carrying and transporting the articles contacts each successive pulley assembly. The pattern of the pulley assemblies defines the curved path of transport for the articles.

DETAILED DESCRIPTION OF THE ILLUSTRATED EMBODIMENT

In the accompanying drawings there is illustrated a cable conveying device which embodies the principles of the present invention. Essentially intended as a conveying device for articles, such as cans, the conveyor transports the article through a curved path of transport by carrying them on a moving cable. To elevate or lower the articles from one level to another, the conveyor provides a spiraling path of transport. To turn a corner, the conveyor provides an arc.

Figure 1:
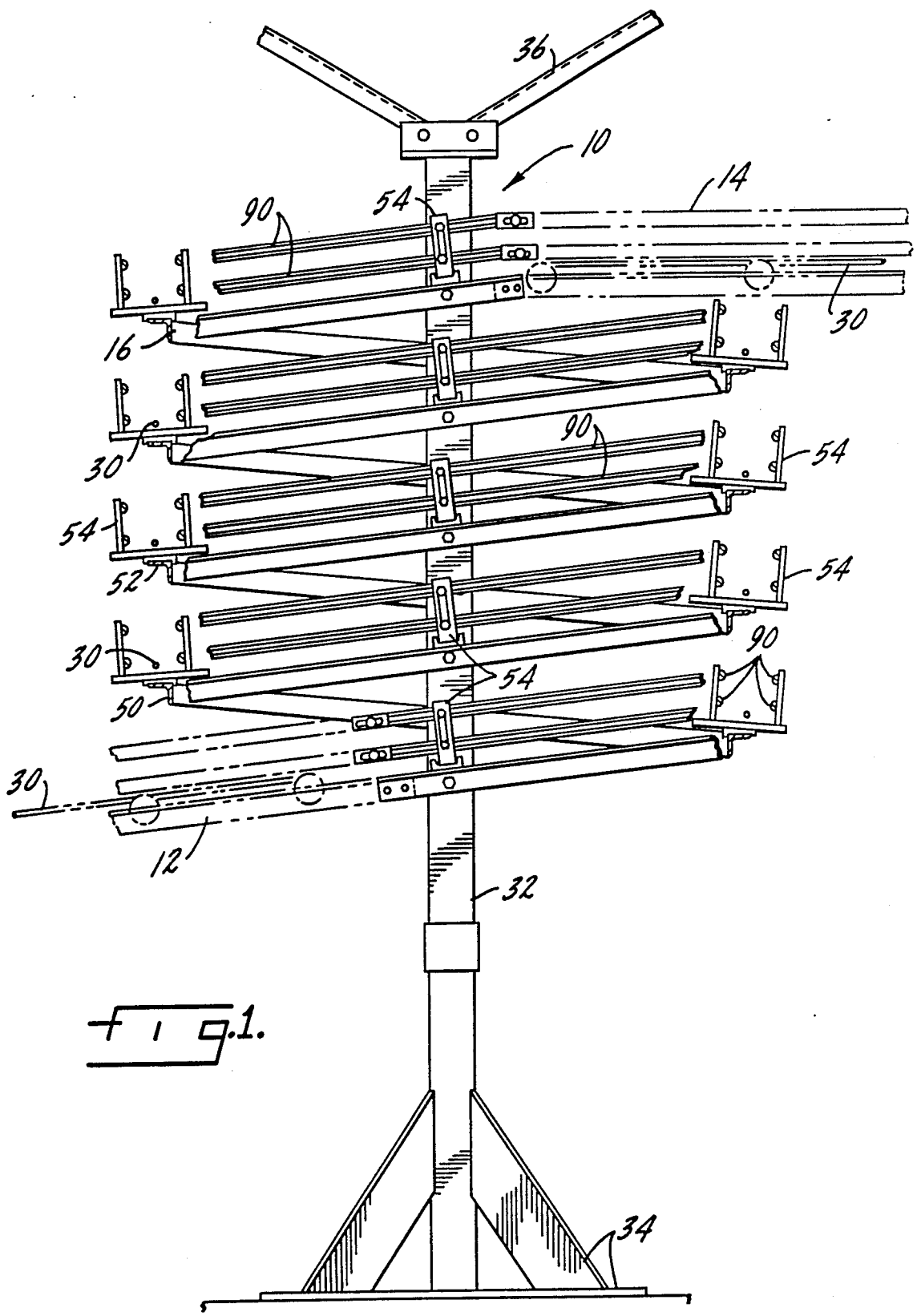
FIG. 1 is a side view of a conveyor embodying the principles of the present invention, with parts broken away and background omitted for clarity.
Figure 2:
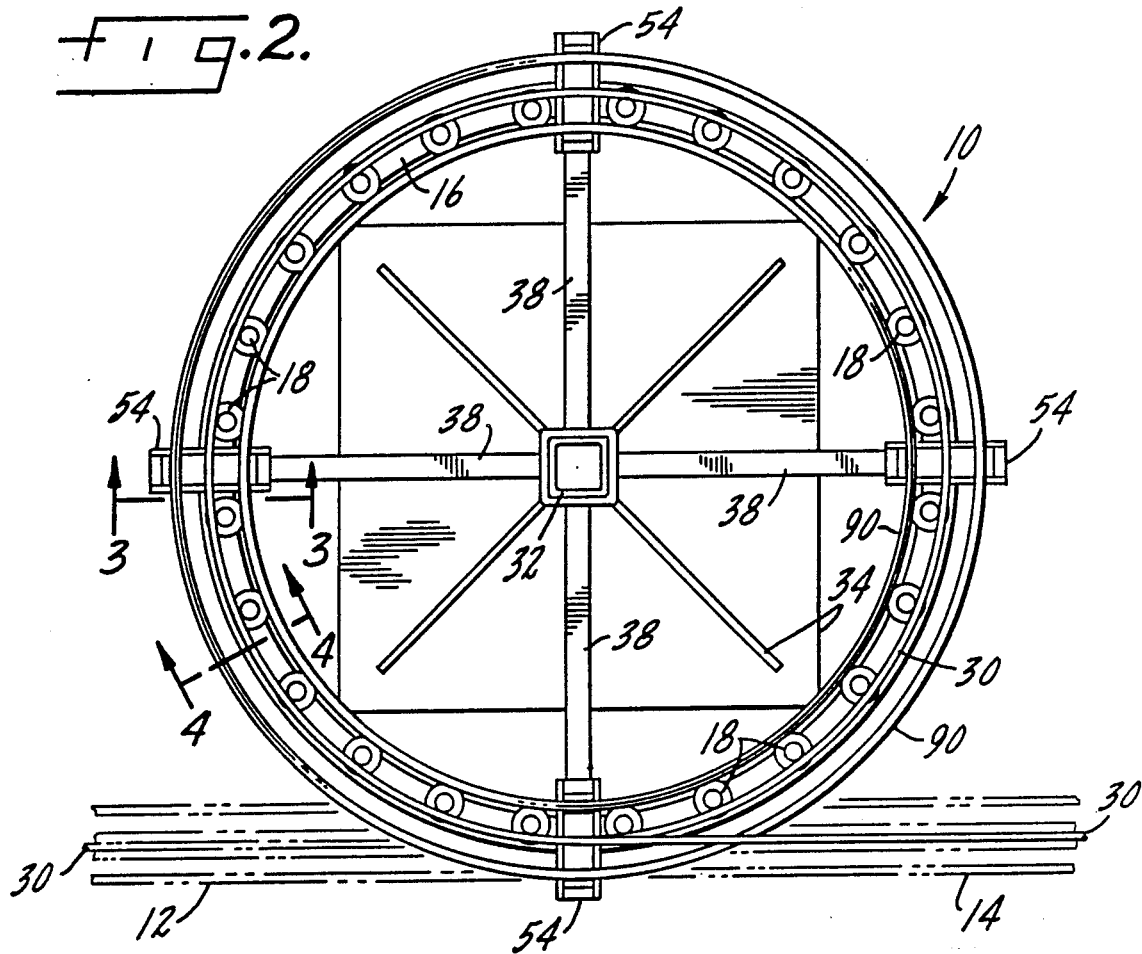
FIG. 2 is a top view of the apparatus of FIG. 1.

Referring to FIGS. 1 and 2, the conveyor of the illustrated embodiment, generally designated 10, is shown positioned on the floor of a factory. The illustrated conveyor may be used as an elevator or lowerator, to transport the articles from one level to another. As an elevator, the illustrated embodiment is connected to an infeed 12 at a first lower level and a discharge 14 at a second higher level. As a lowerator, the positions of the infeed and discharge are reversed: the infeed is at the higher level and the discharge is at the lower level.

The conveyor 10 illustrated in FIGS. 1 and 2 includes a conveyor frame 16 shaped into a spiral. A plurality of pulley assemblies 18 are rotatably mounted on the conveyor frame 16 in a spiral pattern. A cable 30 for carrying and transporting the articles tangentially contacts and is guided by each successive pulley assembly 18. The cable is pulled through the spiral path defined the pulley assemblies. In the illustrated embodiment, the pulley assemblies are disposed on the conveyor frame such that the path they define is shaped substantially the same as the shape of the conveyor frame 16. Thus, in this embodiment, the shape of the conveyor frame defines the pattern of the pulley assemblies, and thereby defines the path transport of the articles.

The embodiment illustrated in FIGS. 1 and 2 also includes a means associated with the conveyor frame for maintaining the articles on the conveyor and a means associated with the conveyor frame for preventing interference between the articles and the pulley assemblies.

As shown in FIGS. 1 and 2, the conveyor frame 16 is supported on a vertically-extending main frame 32. The main frame 32 is generally square in cross-section and is supported by support means. This support means includes base members 34 which support the main frame on the floor of the facility. This support means also includes braces 36 at the top of the main frame 32, to brace the main frame against the ceiling of the facility.

As shown in FIG. 2, the main frame 32 is encircled by the conveyor frame 16. The main frame 32 carries a plurality of radially-extending support arms 38 which serves to support the spiraling conveyor frame 16. The support arms 38 are staggered at 90° intervals around the main frame 32, and each support arm 38 is disposed at a successively higher level.

The illustrated support arms 38 on one conveyor are all of the same length, and their lengths may be for example, 24 inches, 30 inches, or 36 inches. Although the invention is not limited to these lengths, with support arms of any of these lengths, the conveyor 10 takes up a relatively small amount of floor space in the facility.

The illustrated support arms 38 are hollow metal tubes, generally square in cross-section. They may be secured to the main frame 32 by any suitable means; for example, they may be welded to mounting sleeves which slip onto the bolt to the main frame.

To secure the illustrated support arms 18 to the conveyor frame 16, each support arm includes an end cap 40, having a threaded bore so that the conveyor frame may be bolted to each support arm.

The illustrated conveyor frame 16 is formed of an elongated piece of aluminum, curved into a spiral. The entire conveyor frame need not be formed of one piece of aluminum; several pieces may be connected to form the spiraling frame. The upward slope of the spiral depends upon the articles being transported, the speed of transport, and the application. An upward slope of from about ⅜ inch to 1¼ inches per foot may be used successfully in the illustrated embodiment.

The illustrated conveyor frame 16 is generally L-shaped in cross-section. One face 50 is generally vertical, and has a plurality of bores so that the conveyor frame may be bolted to the end caps 40 of the support arms 38.

A second face 52 of the conveyor frame 16 has two sets of holes. In one set, the holes are spaced approximately 6 inches apart along the length of the frame; these holes are provided for mounting the pulley assemblies 18 on the conveyor frame 16. A second set of holes, each hole being deposed at 90° intervals, is provided for mounting a group of side rail saddle assemblies 54 onto the frame 16.

In the illustrated embodiment, the pulley assemblies 18 are disposed in a spiraling pattern around the conveyor frame 16, and the cable 30 is disposed around the outside of each pulley assembly. The pulley assemblies define a spiral path around the curve of the conveyor frame. They tangentially contact and guide the cable so that as the cable is pulled, it follows the spiral path defined by the pattern of the pulley assemblies, a path which is shaped substantially the same as the shape of the conveyor frame.

The cable 30 is generally circular in cross-section. In the illustrated embodiment, a ⅜ inch diameter cable is used. The cable 30 may be made of any suitable material; the following cables have produced satisfactory results: "Rochester" 6×19 galvanized cable with a nylon covering; "Bethlehem" 6×19 galvanized cable; and "Volta" plastic cable with a fiberglass core. In the illustrated embodiment, the cable 30 is pulled through the path of transport by a motor (not shown).

Figure 4:
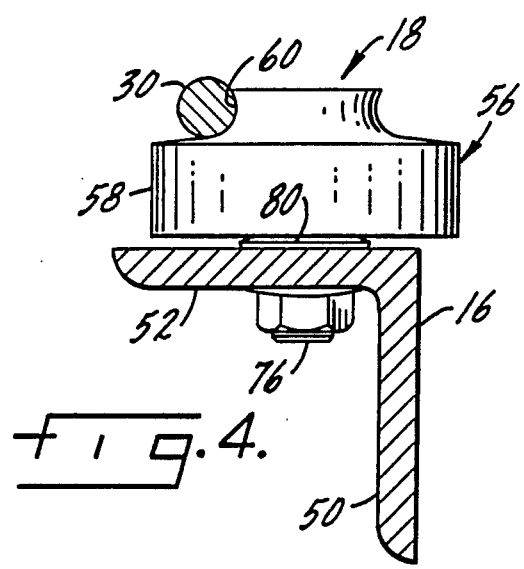
FIG. 4, is an enlarged sectional view of the apparatus of FIG. 1, taken along line 4-4 of FIG. 2.

A pulley assembly 18 is illustrated in FIG. 4. In the illustrated embodiment it includes a cable guide sheave 56 rotatably mounted on the conveyor frame 16. The sheave 56 is made of molded plastic acetal. It includes a cylindrical base 58 and an annular flange 60. The annular flange 60 is disposed around the central vertical axis of the sheave 56. The flange 60 defines a concave arcuate surface, integral with the top surface of the cylindrical base 58. The top surface of the cylindrical base 58 slopes slightly upwardly, at an angle of about 4°-5°, from the perimeter of the base, to meet the concave arcuate surface of the flange 60.

The cable 30 rides upon the top surface of the cylindrical base 58, against the concave arcuate surface of the flange 60. The concave arcuate surface's curvature is adapted to mate with the curvature of the cable 30, to maintain the cable in position against the sheave, while leaving the top of the cable exposed above the sheave. In the illustration embodiment, the arcuate surface defines an arc of about 113°; with a ⅜ inch diameter cable, about 0.060 inches to 0.090 inches of cable is exposed above the sheave. Thus, the moving cable, in tension, is maintained in position against each successive pulley assembly, while carrying the articles above the pulley assemblies.

Figure 5:
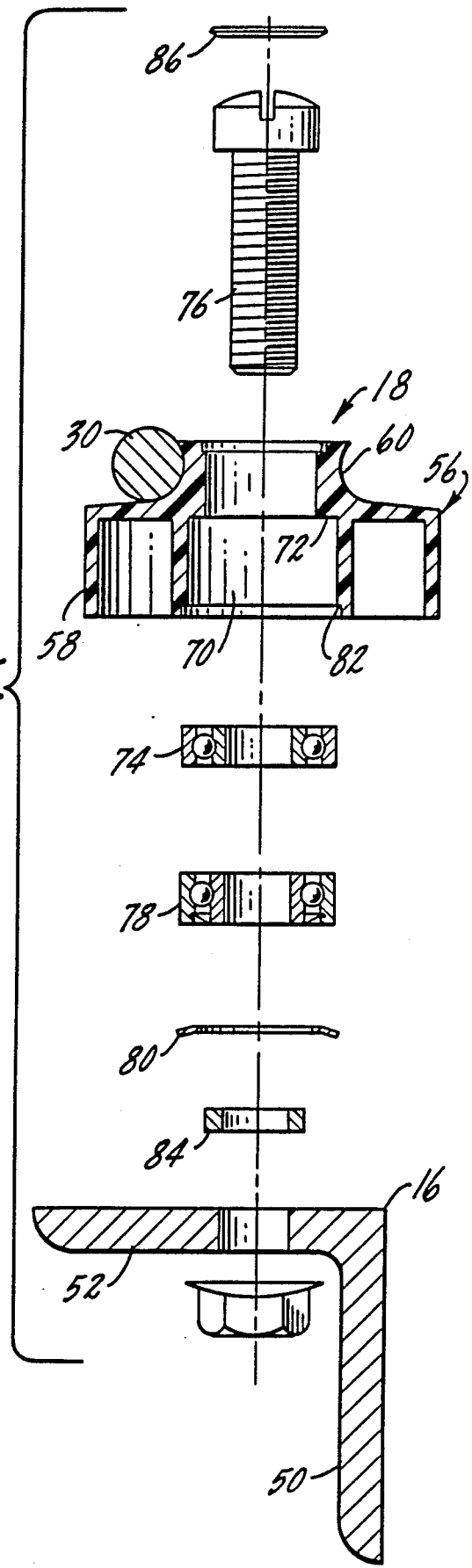
FIG. 5 is an exploded sectional view of a pulley assembly utilized in the apparatus of FIG. 1 and shown in FIG. 4.

As shown in FIG. 5, the pulley assembly's cable guide sheave 56 has a central bore 70 with an annular shoulder 72. The shoulder 72 is contacted by the outer race of an upper ball bearing 74. The annular inner race of this bearing 74 is disposed around a bolt 76. The annular inner race of a sealed lower ball bearing 78 is also disposed around the bolt 76, and the lower ball bearing 78 is disposed against the upper ball bearing 74. An annular thrust retaining ring 80 bears against the lower bearing 78 and is pressed into a recess 82 in the sheave 56. An annular spacer 84 is disposed between the sheave 56 and the face 52 of the conveyor frame 16. The bolt 76 extends through the cable guide sheave 56, upper ball bearing 76, lower ball bearing 78, thrust retaining ring 80, annular spacer 84, and face 52 of the conveyor frame 16. An end cap 86 is snap fit onto the sheave to cover the head of the bolt 76. Thus, the pulley assemblies are bolted to the conveyor frame 16. They rotate freely, without interference from the conveyor frame, about essentially vertical axes.

To maintain the articles on the cable 30 and to prevent interference between the articles and the pulley assemblies 18, the illustrated embodiment utilizes a plurality of side rail saddle assemblies 54 and side rails 90. As shown in FIGS. 1 and 2, the saddle assembles 54 are disposed at 90° intervals along the conveyor frame 16, proximate to the support arms 38.

Figure 3:
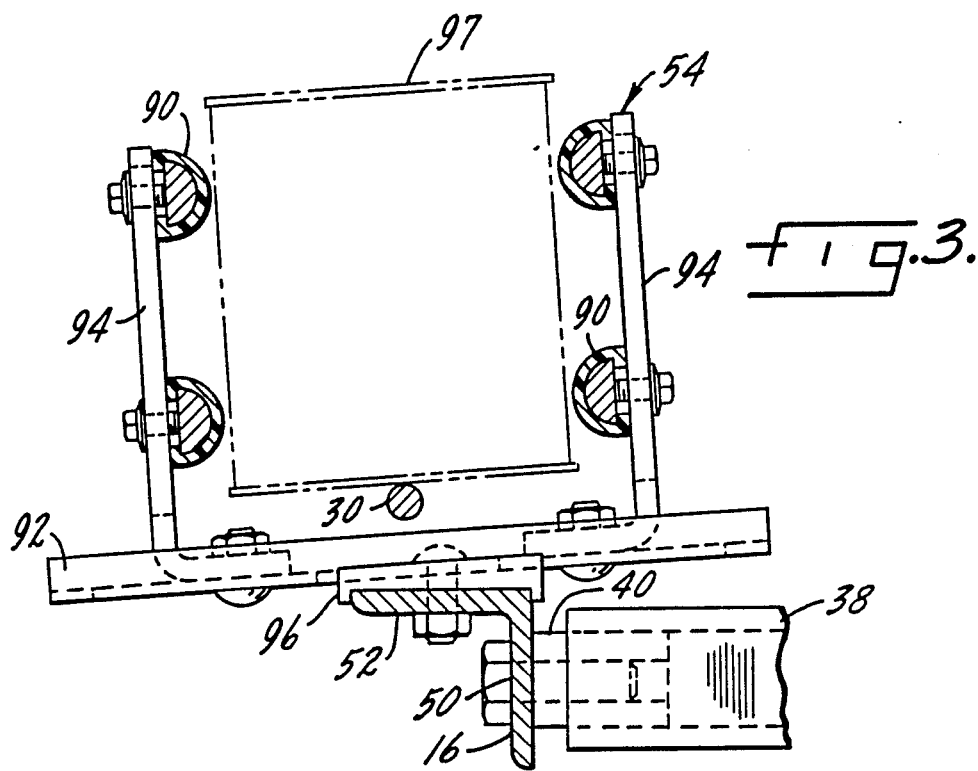
FIG. 3 is an enlarged sectional view of the apparatus of FIG. 1, taken along line 3—3 of FIG. 2.

As shown in FIG. 3, each saddle assembly 54 includes a saddle cross support 92 and two opposing saddle uprights 94 bolted to the cross support. The cross support may be slotted so that the distance between the uprights 94 can be varied to accommodate articles of different sizes. Each upright 94 is bolted to a pair of side rails 90. The side rails 90 are curved into a spiral shape, substantially the same as the spiral shape of the conveyor frame 16. The side rails 90 may be made of a plastic-covered ¾ inch half-round of anodized aluminum.

An inclined saddle locator 96 is disposed between the cross support 92 and the face 52 of the conveyor frame, and the saddle assembly is bolted to the conveyor frame through the locator. The saddle locator 96 serves to incline the saddle assembly 54 and side rails 90 downwardly toward the periphery of the conveyor. In the illustrated embodiment, the locator 96 tilts the assembly 54 and side rails about 3½° from vertical. Inclines of from about 2° ot 4° from the vertical should produce satisfactory results.

Thus, the pulley assemblies provide a means for guiding the cable through a path of transport shaped substantially the same as the shape of the conveyor frame. The cable 30 runs between the opposing uprights 94 and above the cross support 92. Thus, the articles 97 are carried between opposing side rails throughout and are tilted away from the pulley assemblies throughout their transport.

The illustrated embodiment may be almost completely manufactured outside of the facility where it is to be used. It may easily be installed at the facility by connecting the conveyor to infeed and discharge conveyors. The infeed conveyor 12 should be pitched at about the same angle as the spiral. Once installed, the illustated embodiment takes up a relatively small amount of floor space in the facility.

In operation, the articles are carried by the cable and transported around the spiral path defined by the pulley assemblies and the conveyor frame. The side rails maintain the articles on the cable, and the incline of the saddle assemblies and side rails tilts the articles so that there is no interference between the articles and the pulley assemblies. Because of the comparatively large radius of curvature of the conveyor frame, the illustrated embodiment lends itself well to high-speed conveying and to conveying large articles. And because the articles are transported through frictional contact with the cable, articles may be accumulated on the running cable if there is a stoppage ahead of the conveyor, without shutting down the conveyor.

In addition to serving as a lowerator or elevator, the invention may be useful where a cooling step is needed in a manufacturing process. For example, two spirals may be combined to first lower and then elevate the articles.

Figure 6:
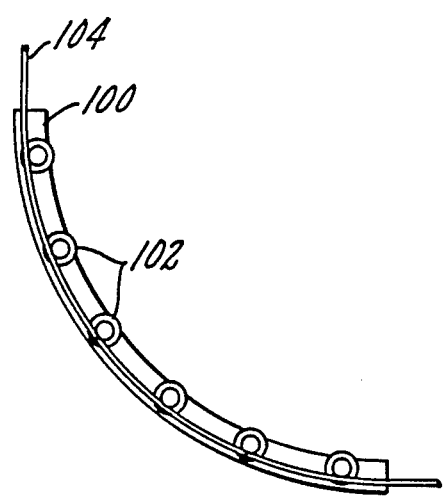
FIG. 6 is a top view of another embodiment of the present invention.

In addition, the present invention is useful as a cornering device, to transport the articles from one direction of transport to another. As illustrated in FIG. 6, a conveyor frame 100 may be curved into an arc of a comparatively large radius of curvature. A plurality of pulley assemblies 102 are rotatably mounted on the conveyor frame 100, with a cable 104 tangentially contacting each successive pulley assembly. The pulley assemblies are spaced on the conveyor frame to define a curved path, shaped substantially the same as the arc of the conveyor frame. Although not shown in FIG. 6, the side rails 90 and side rail saddle assemblies 54 described above may also be used in this embodiment to maintain the articles on the conveyor and to prevent interference with the pulley assemblies. With the large radius of curvature available, this embodiment also lends itself well to high-speed conveying and to transporting large articles.

Although the invention has been described with respect to the two illustrated embodiments, the invention is not limited to these embodiments. Additional modifications and/or additions may be included by those skilled in the art without departing from the scope of the invention as defined by the claims.

I claim:

1. The A pulley assembly for use in a cable conveyor system, the pulley assembly being adapted to be rotatably mounted upon a conveyor frame, the pulley assembly comprising:
   a cable guide sheave including:
      a cylindrical base having a top surface; and
      an annular flange defining a concave arcuate surface integral with the top surface of the cylindrical base,
      wherein the cable rides against the concave arcuate surface of the annular flange and the flange is adapted to maintain the position of the cable against the sheave while leaving a portion of the top of the cable exposed above the sheave; and
      a central bore extending fully through the sheave and having an annular shoulder therein, the shoulder and the bore being disposed around the central vertical axis of the sheave;
   a bolt extending through the central bore of the sheave for bolting the pulley assembly to the conveyor frame;
   a pair of bearings in a pre-assembled bearing assembly, including an upper ball bearing having an outer race disposed against the annular shoulder in the central bore of the sheave and an inner race disposed around the bolt, and a lower ball bearing having inner and outer races disposed against the inner and outer races, respectively, of the upper ball bearing in the sheave's central bore, the lower bearing's inner race being disposed around the bolt, and an annular thrust retaining ring disposed against the lower ball bearing, the thrust retaining ring being pressed into a recessed area of the sheave to hold the bearings in the central bore prior to placement of the bolt through said bore; and
   an annular spacer disposed between the thrust retaining ring and the conveyor frame to allow the pulley assembly to rotate freely above the conveyor frame.

* * * * *